United States Patent
Lee et al.

(10) Patent No.: US 7,800,629 B2
(45) Date of Patent: Sep. 21, 2010

(54) IMAGE PROCESSING APPARATUS AND METHOD FOR PREVENTING DEGRADATION OF IMAGE QUALITY WHEN BIT FORMAT OF IMAGE IS CONVERTED

(75) Inventors: Seung-Cheol Lee, Suwon-si (KR); Sang-Bong Lee, Suwon-si (KR); Joon-Kyu Moon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 723 days.

(21) Appl. No.: 11/789,702

(22) Filed: Apr. 25, 2007

(65) Prior Publication Data

US 2007/0257932 A1    Nov. 8, 2007

(30) Foreign Application Priority Data

Apr. 25, 2006   (KR) .................. 10-2006-0037406

(51) Int. Cl.
| | |
|---|---|
| G09G 5/00 | (2006.01) |
| G09G 5/02 | (2006.01) |
| H04N 11/00 | (2006.01) |
| H04N 1/46 | (2006.01) |
| G03F 3/08 | (2006.01) |
| G06K 9/40 | (2006.01) |
| G06K 9/32 | (2006.01) |

(52) U.S. Cl. .................... 345/600; 345/643; 345/586; 345/589; 345/606; 348/466; 348/627; 348/683; 358/518; 358/523; 358/525; 358/448; 382/166; 382/232; 382/254; 382/300; 375/240.27

(58) Field of Classification Search .............. 345/581, 345/586, 589, 600–606, 616, 618, 643, 547–549; 348/441, 466, 467, 469, 568, 575, 627, 683; 358/518, 521, 523, 525, 448, 461; 382/162, 382/166, 167, 232, 233, 254, 274, 276
See application file for complete search history.

(56) References Cited

U.S. PATENT DOCUMENTS

| 6,052,414 | A  | * | 4/2000 | Lee et al. ............... 375/240.16 |
|---|---|---|---|---|
| 7,038,814 | B2 | * | 5/2006 | Huovinen ................. 358/1.9 |
| 2003/0179393 | A1 | * | 9/2003 | Huovinen ................. 358/1.9 |
| 2004/0041926 | A1 | * | 3/2004 | Takano et al. ............... 348/241 |
| 2006/0220954 | A1 | * | 10/2006 | Hunt et al. ............. 342/357.02 |
| 2007/0127826 | A1 | * | 6/2007 | Kishi .................... 382/232 |
| 2008/0043839 | A1 | * | 2/2008 | Kitamura ............... 375/240.05 |

* cited by examiner

*Primary Examiner*—Wesner Sajous
(74) *Attorney, Agent, or Firm*—The Farrell Law Firm, LLP

(57) ABSTRACT

Provided is an image processing apparatus and method for preventing degradation of image quality occurring when a bit-format of an image is converted. When a raw image is converted to an image having specific color resolution, the image to be converted can maintain an image close to the raw image by obtaining errors between pixels of the raw image and the image to be converted and minimizing the errors between the raw image and the image to be converted using an error diffusion scheme.

16 Claims, 8 Drawing Sheets

IMAGE PROCESSING APPARATUS AND METHOD FOR PREVENTING DEGRADATION OF IMAGE QUALITY WHEN BIT FORMAT OF IMAGE IS CONVERTED

PRIORITY

This application claims priority under 35 U.S.C. §119 to an application entitled "Image Processing Apparatus and Method for Preventing Degradation of Image Quality when Bit Format of Image is Converted" filed in the Korean Intellectual Property Office on Apr. 25, 2006 and assigned Ser. No. 2006-37406, the contents of which are hereby incorporated by reference.

BACKGROUND OF THE INVENTION

1. Field of the Invention

The present invention relates generally to an image processing apparatus and method, and in particular, to an image processing apparatus and method for preventing degradation of image quality occurring when a bit format of an image is converted.

2. Description of the Related Art

In general, accompanying a significant increase of performance of mobile communication terminals such as cellular phones, mobile communication terminals, which can realize various multimedia functions, have become widely available on the market. In particular, quality of content or images for performing the various multimedia functions supported by the mobile communication terminals have been developed to a higher quality. Although a performance level of a menu screen or a screen for performing a multimedia function in such a mobile communication terminal is almost similar to that of a personal computer (PC) or a television (TV), a technical gap exists in at least a display unit for displaying on such a screen.

A liquid crystal display (LCD) is mainly used for display units of the mobile communication terminals, and color reproduction performance of the display units is an 18-bit color level or less. In particular, an interface of a back-end chip for driving the display units of the mobile communication terminals is a 16-bit level. When colors of an image are displayed by such a display unit, the number of bits of an interface is very important. In general, since 24-bit true color are realized in a PC or a digital TV, the number of colors, which can be used for an image, is 16,700,000 ($=2^{24}$).

However, a display unit of a mobile communication terminal can identify only 65,000 ($=2^{16}$) colors, which is much less than the 16,700,000 ($=2^{24}$) colors that can be identified by a PC or a digital TV. When content to be displayed by a mobile communication terminal is produced using a PC, a 24-bit image is edited, and when the edited 24-bit image is stored in the mobile communication terminal, the 24-bit image must be converted to an image having color resolution supportable by a display unit of the mobile communication terminal. If the display unit of the mobile communication terminal supports 16-bit color, the mobile communication terminal stores the image by converting the 24-bit image edited using the PC to a 16-bit image.

Color resolution of an LCD included in early mobile communication terminals was 256 colors, and bitmap images having a quality corresponding to 256 colors were used for a graphic user interface (GUI). Even though performance of an LCD interface of a mobile communication terminal more than doubled due to a quick increase of a hardware developing speed, a content upgrading speed was slow, and thus, content having color resolution much less than 16 bits was provided to the mobile communication terminal as illustrated in diagram (a) of FIG. 1. When color resolution used for an image was less than 16 bits, even if the image was edited using 24-bit color in a PC and converted to a 16-bit image, there was no problem in the side of the mobile communication terminal.

However, according to a quick development of a GUI of a mobile communication terminal, an application range has widened, and thus, color resolution used to edit an image is more than 16 bits. Thus, when a bit format of an image is converted in a PC, that is, if an image is converted to an image having color resolution supportable by a mobile communication terminal supporting 16-bit color, since the mobile communication terminal cannot express all colors used in 24-bit color, the converted image is created using a method of mapping the nearest colors among the 16,700,000 colors to a representative color in order to express the 65,000 colors from the 24-bit raw image.

As illustrated in diagram (b) of FIG. 1, when a photograph or a high quality image corresponding to a photograph is edited in a PC and converted to an image to be used in a mobile communication terminal, the number of lost colors is significant, thereby occurring profound degradation of image quality. In more detail, as illustrated in FIG. 2, colors corresponding to pixel values 0~255 in a 24-bit image can be mapped to a color corresponding to a pixel value 0 in a 16-bit image, and color corresponding to pixel values 256~511 in the 24-bit image can be mapped to a color corresponding to a pixel value 1 in the 16-bit image. That is, although colors corresponding to pixel values 512 and 767 are different colors in a 24-bit raw image, the colors are mapped to the same color corresponding to a pixel value 2 in a 16-bit image after performing an image bit-format conversion process.

As described above, if a 24-bit image is converted to a 16-bit image, degradation of image quality is profound. FIG. 3 illustrates degradation of image quality occurring when a 24-bit image is converted to a 16-bit image. While an image illustrated in diagram (a') of FIG. 3, which is obtained by magnifying a portion of a 24-bit image illustrated in diagram (a) of FIG. 3, is smoothly gradated, since a 16-bit image illustrated in diagram (b) of FIG. 3, which is obtained by converting the image illustrated in diagram (a) of FIG. 3, cannot use all of 24-bit colors, colors close to each representative color are expressed as the representative colors in the 16-bit image illustrated in diagram (b) of FIG. 3, thereby occurring discontinuous gradation. While colors are distributed all over the range in diagram (a) of FIG. 4A, which illustrates pixel distribution of the image illustrated in diagram (a') of FIG. 3, colors are distributed on sub-sampled representative values not all over the range in FIG. 4B, which illustrates pixel distribution of an image illustrated in diagram (b') of FIG. 3.

As described above, according to the prior art, a photograph or a high quality image corresponding to a photograph, i.e., an image in which more than 65,000 colors are used, is edited, converted to an image suitable for a mobile communication terminal, and transmitted to the mobile communication terminal. Since all colors used in an image expressed using more than 65,000 colors cannot be used as they are, the image is mapped to and expressed by using representative colors in an image bit-format conversion process. Thus, in the process of converting a raw image to an image suitable for a mobile communication terminal, which is performed in a PC, degradation of image quality is profound. In order to effectively implement a GUI used in a mobile communication terminal, a method for minimizing the degradation of image quality when an image is converted to an image suitable for a mobile communication terminal in an external device, such as a PC, is required. In addition, a method for performing conversion of a downloaded or stored image in a mobile communication terminal without converting a raw image to an image suitable for the mobile communication terminal is required.

SUMMARY OF THE INVENTION

An object of the present invention is to substantially solve at least the above problems and/or disadvantages and to provide at least the advantages below. Accordingly, an object of the present invention is to provide an image processing apparatus and method for minimizing the degradation of an image quality when a high quality raw image is converted to an image suitable for a mobile communication terminal.

Another object of the present invention is to provide an image processing apparatus and method for minimizing the visual degradation of an image quality when a high quality raw image is converted to an image suitable for a mobile communication terminal in the mobile communication terminal.

According to one aspect of the present invention, there is provided an image processing apparatus for preventing degradation of image quality occurring when a bit format of an image is converted, the apparatus includes a decoder for decoding an input N-bit raw image; an image pre-processor for generating an error-compensated image by extracting an error value per pixel, which is a difference value between pixels of the same positions of the decoded N-bit image and an M-bit image to be converted, generating an error-diffused image by accumulating a value obtained by multiplying the error value per pixel by a different weight proportion with respect to each of predetermined adjacent pixels, and adding the M-bit image to the error-diffused image; an M-bit converter for converting the error-compensated image to an M-bit image; an image compressor for compressing the converted M-bit image; a memory for storing the compressed M-bit image and an index table containing storage information of the M-bit image; and a controller for controlling the storing of the compressed M-bit image output from the image compressor in the memory and the storing of the storage information generated when the compressed M-bit image is stored in the memory in the index table.

According to another aspect of the present invention, there is provided a method of preventing degradation of image quality occurring when a bit format of an image is converted in an image processing apparatus, the method includes determining a format of an input N-bit raw image and performing decoding suitable for the determined format; generating an error-compensated image by extracting an error value per pixel, which is a difference value between pixels of the same positions of the decoded N-bit image and an M-bit image to be converted, generating an error-diffused image by accumulating a value obtained by multiplying the error value per pixel by a different weight proportion with respect to each of predetermined adjacent pixels, and adding the M-bit image to the error-diffused image; converting the error-compensated image to an M-bit image; compressing the converted M-bit image; and storing the compressed M-bit image and an index table containing storage information of the M-bit image.

According to another aspect of the present invention, there is provided a mobile communication terminal for preventing degradation of image quality occurring when a bit format of an image is converted, the mobile communication terminal including a decoder for decoding an input N-bit raw image; an image pre-processor for generating an error-compensated image by extracting an error value per pixel, which is a difference value between pixels of the same positions of the decoded N-bit image and an M-bit image to be converted, generating an error-diffused image by accumulating a value obtained by multiplying the error value per pixel by a different weight proportion with respect to each of predetermined adjacent pixels, and adding the M-bit image to the error-diffused image; an M-bit converter for converting the error-compensated image to an M-bit image; a memory for storing the converted M-bit image; and a controller for controlling the storing of the converted M-bit image output from the M-bit converter in the memory.

According to another aspect of the present invention, there is provided a method of preventing degradation of image quality occurring when a bit format of an image is converted in a mobile communication terminal, the method includes determining a format of an input N-bit raw image and performing decoding suitable for the determined format; generating an error-compensated image by extracting an error value per pixel, which is a difference value between pixels of the same positions of the decoded N-bit image and an M-bit image to be converted, generating an error-diffused image by accumulating a value obtained by multiplying the error value per pixel by a different weight proportion with respect to each of predetermined adjacent pixels, and adding the M-bit image to the error-diffused image; converting the error-compensated image to an M-bit image; and storing the converted M-bit image.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figures 1, 2:
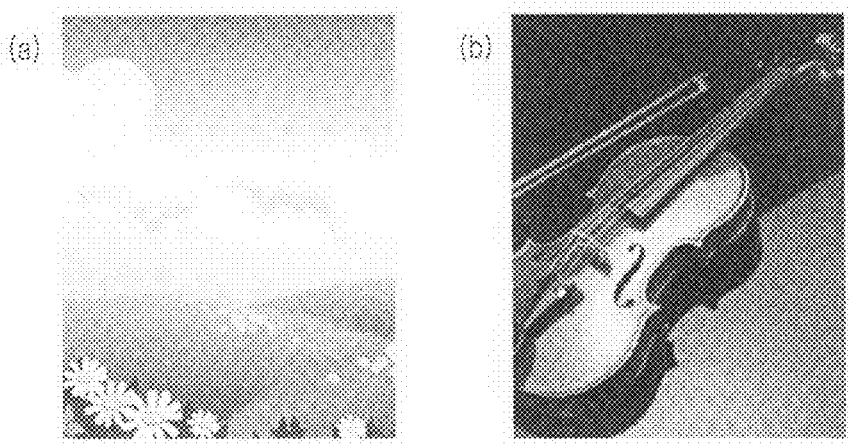
FIG. 1 illustrates diagrams for explaining quality of a content image for a conventional mobile communication terminal.
FIG. 2 is a general table illustrating colors of a 16-bit image mapped to colors of a 24-bit image when the 24-bit image is converted to the 16-bit image.
Figure 3:
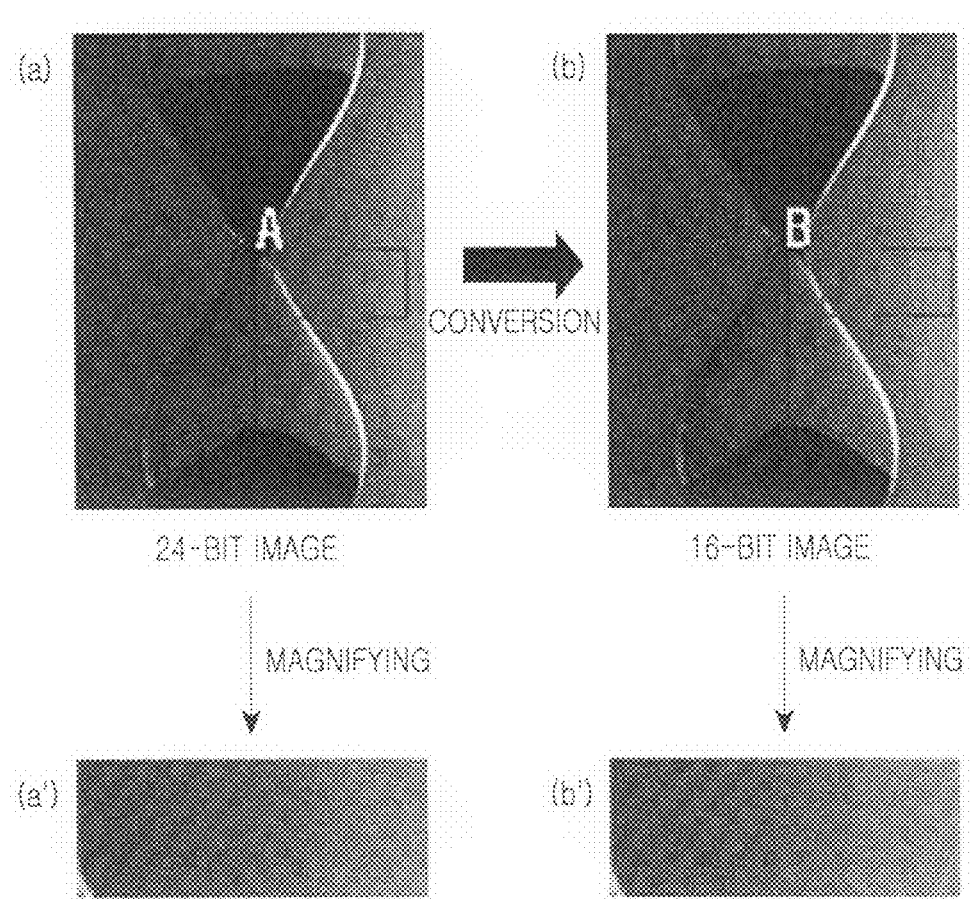
FIG. 3 illustrates diagrams for explaining degradation of image quality occurring when a 24-bit image is converted to a 16-bit image according to the prior art.
Figure 4:
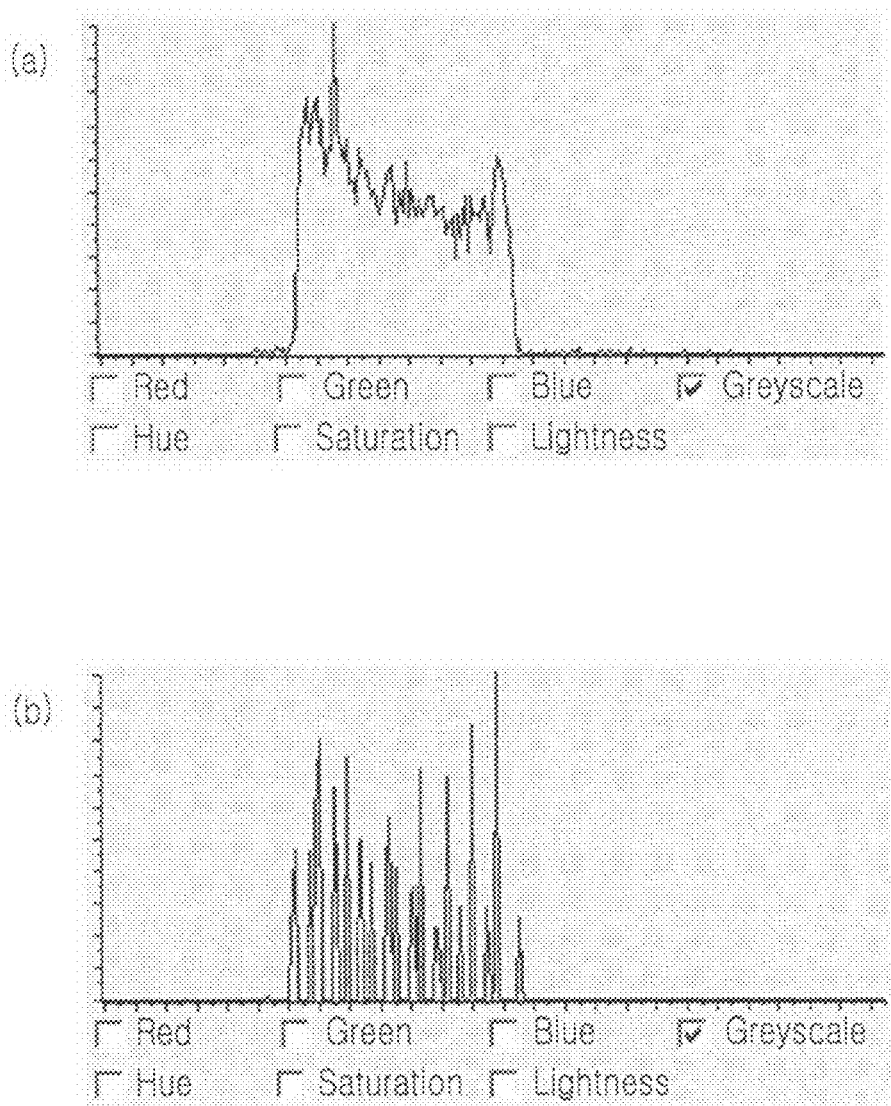
FIG. 4 illustrates pixel distribution diagrams of specific areas of the 24-bit image and the 16-bit image illustrated in FIG. 3.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention provides an image processing method in which a pre-processing process for minimizing visual degradation of image quality when a high quality image is converted to an image for a mobile communication terminal is performed. In the present invention, it is assumed that color resolution of a high quality image, i.e., a raw image, is 24 bits and color resolution of an image for a mobile communication terminal is 16 bits. The present invention provides an image processing apparatus for minimizing the visual degradation of an image quality occurring when a 24-bit image is converted to a 16-bit image. The image processing method of the present invention can be applied to when a 24-bit image is converted to a 16-bit image and when an N-bit high quality image is converted to an M-bit image where, (M<N).

In addition, when a high quality raw image is converted to an image for a mobile communication terminal, image data converted by performing a conversion process in an external device, such as a PC, can be stored in a mobile communication terminal, or a high quality image, such as a downloaded image, can be converted to an image for a mobile communication terminal using the image processing apparatus suggested in the present invention, which is included in the mobile communication terminal. Thus, in the present invention, a method for converting a high quality raw image to an image for a mobile communication terminal in an external device, such as a PC, and a method for converting a high quality raw image to an image for a mobile communication terminal in the mobile communication terminal will be described.

Figure 5:
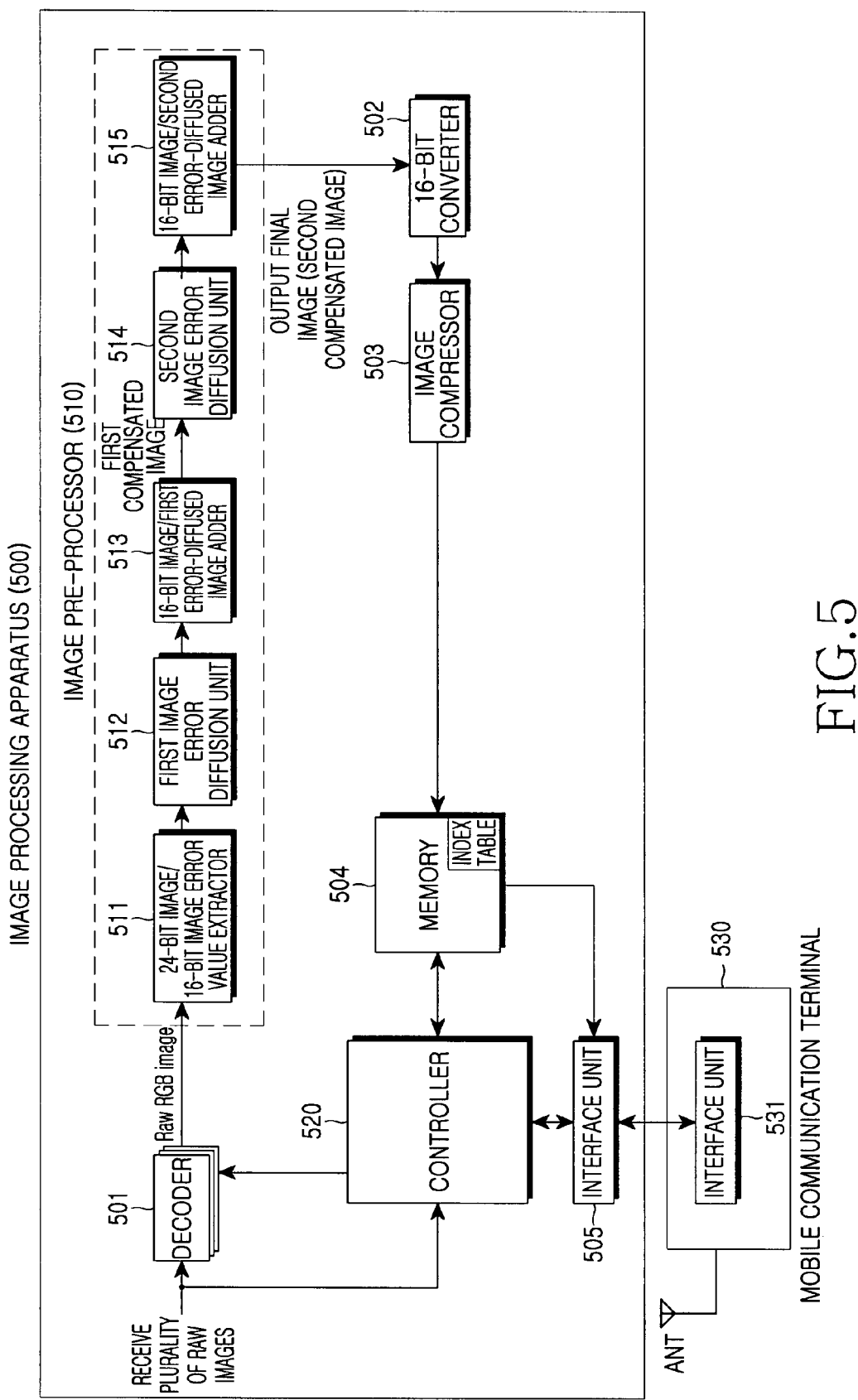
FIG. 5 is a block diagram of an image processing apparatus for preventing degradation of image quality occurring when a bit format of an image is converted according to the present invention.
Figure 6:
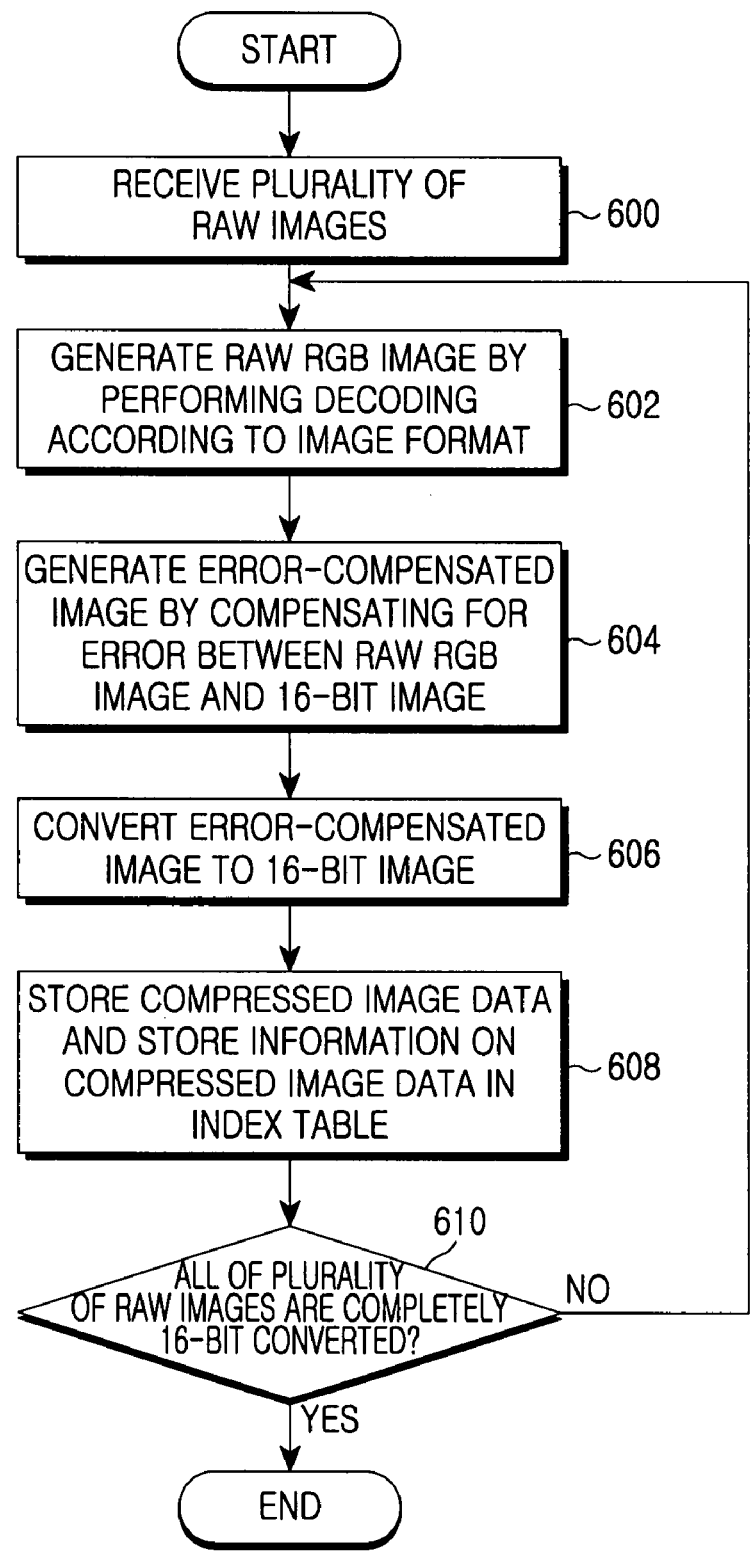
FIG. 6 is a flowchart illustrating a method of preventing degradation of image quality occurring when a bit format of an image is converted in the image processing apparatus illustrated in FIG. 5 according to the present invention.

The method for converting a high quality raw image to an image for a mobile communication terminal in the image processing apparatus suggested in the present invention, which is included in an external device, such as a PC, will now be described with reference to FIGS. 5 and 6. FIG. 5 is a block diagram of an image processing apparatus 500 for preventing degradation of image quality occurring when a bit format of an image is converted according to the present invention. Referring to FIG. 5, the image processing apparatus 500 includes a controller 520 for performing a general control operation for image bit-format conversion, a decoder 501, an image pre-processor 510, a 16-bit converter 502, an image compressor 503, a memory 504, and an interface unit 505.

If a plurality of raw images, bit-formats of which are to be converted, are input, the controller 520 determines a format of each of the input raw images. Since images having various formats can be input, the controller 520 determines a format of each input raw image for performing decoding suitable for the format and controls the decoder 501 to perform the decoding. The controller 520 controls the image pre-processor 510 to generate an error compensated image by compensating for an error between a raw image and a 16-bit image and controls the 16-bit converter 502 to convert the error compensated image to a 16-bit image. A detailed process of generating an error compensated image by compensating for an error between a raw image and a 16-bit image in the image pre-processor 510 will be described later. The controller 520 controls the image compressor 503 to compress the converted 16-bit image data, stores the compressed 16-bit image data in the memory 504, and stores information on the compressed 16-bit image data in an index table. Thereafter, the controller 520 performs an N-bit conversion operation with respect to all of the input raw images. If a user requests to transmit compressed image data stored in the memory 504 to a mobile communication terminal 530, the controller 520 controls the interface unit 505 to transmit the compressed image data and the index table to the mobile communication terminal 530.

The decoder 501, which has performed the decoding of a specific image format input from the controller 510, decodes each of the input raw images according to the image format and outputs a decoded raw RGB image. That is, the decoder 501 decodes an image having a BMP, JPG, or PNG format to an image having a format of R (red), G (green), and B (blue) channels and outputs a 24-bit lossless decoded raw RGB image to the image pre-processor 510. The decoded raw RGB image is temporarily stored in a buffer (not shown) in order to be used in a pre-processing operation.

The image pre-processor 510, which has received the decoded raw RGB image, compensates for an error through a diffusion operation between the raw RGB image and an image to be converted in order to prevent any degradation of the image quality occurring in an image bit-format conversion process. The image pre-processor 510 includes a 24-bit image/16-bit image error value extractor 511, a first image error diffusion unit 512, a 16-bit image/first error-diffused image adder 513, a second image error diffusion unit 514, and a 16-bit image/second error-diffused image adder 515. Operations for compensating for an error between a raw image and a converted image to prevent degradation of image quality occurring in an image bit-format conversion process, which are performed by the components of the image pre-processor 510, will now be described in detail.

When the decoded 24-bit raw RGB image is input, the 24-bit image/16-bit image error value extractor 511 extracts an error value, which is the difference value between each pixel value of each of R, G and B channels of the raw RGB image and each pixel value of each of R, Q and B channels of a 16-bit image to be converted. The 24-bit image/16-bit image error value extractor 511 continuously provides the extracted error values to the first image error diffusion unit 512, and the first image error diffusion unit 512 diffuses a difference from a relevant pixel value of the raw RGB image toward pixels adjacent to a pixel existing at a position corresponding to each of the provided error values.

Figure 9:
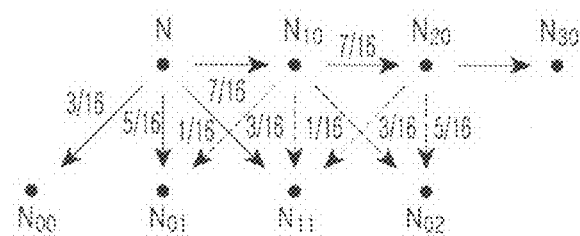
FIG. 9 is a diagram for explaining an error diffusion method in an image pre-processing operation for preventing degradation of image quality according to the present invention.

An error diffusion operation will now be described in detail with reference to FIG. 9. Referring to FIG. 9, if an error value is extracted with respect to a pixel N existing at the same position of the raw RGB image and the 16-bit image to be converted, $7/16$ is weighted in a direction of a pixel $N_{10}$, $1/16$ is weighted in a direction of a pixel $N_{11}$, $5/16$ is weighted in a direction of a pixel $N_{01}$, and $3/16$ is weighted in a direction of a pixel $N_{00}$. That is, a value obtained by multiplying the error value of the pixel N by a certain proportion of the error value is accumulated with respect to each of the pixels $N_{10}$, $N_{11}$, $N_{01}$, and $N_{00}$. A value obtained by multiplying the error value of the pixel N by $7/16$ is accumulated with respect to the pixel $N_{10}$ existing on the right of the pixel N. Likewise, a value obtained by multiplying the error value of the pixel N by $1/16$ is accumulated with respect to the pixel $N_{11}$ existing in a lower right diagonal direction of the pixel N. In addition, a value obtained by multiplying the error value of the pixel N by $5/16$ is accumulated with respect to the pixel $N_{01}$ existing below the pixel N, and a value obtained by multiplying the error value of the pixel N by $3/16$ is accumulated with respect to the pixel $N_{00}$ existing in a lower left diagonal direction of the pixel N.

Thereafter, if an error value is extracted with respect to the pixel $N_{10}$ and provided to the first image error diffusion unit 512, a value obtained by multiplying the error value of the pixel $N_{10}$ by $7/16$ is accumulated with respect to a pixel $N_{20}$ existing on the right of the pixel $N_{10}$, a value obtained by multiplying the error value of the pixel $N_{10}$ by $1/16$ is accumulated with respect to the pixel $N_{02}$ existing in a lower right diagonal direction of the pixel $N_{10}$, a value obtained by multiplying the error value of the pixel $N_{10}$ by $5/16$ is accumulated with respect to the pixel $N_{01}$ existing below the pixel $N_{10}$, and a value obtained by multiplying the error value of the pixel $N_{10}$ by $3/16$ is accumulated with respect to the pixel $N_{01}$ existing in a lower left diagonal direction of the pixel $N_{10}$. Thus, when the error diffusion operation proceeds from the pixel N to the pixel $N_{10}$, the value obtained by multiplying the error value of the pixel N by $1/16$ and the value obtained by multiplying the error value of the pixel $N_{10}$ by $5/16$ are accumulated with respect to the pixel $N_{11}$, and a value obtained by multiplying an error value of a pixel $N_{20}$ by $3/16$ and a value obtained by multiplying an error value of the pixel $N_{01}$ by $7/16$ will be further accumulated with respect to the pixel $N_{11}$ through the error diffusion operation.

As described above, the first image error diffusion unit 512 uses a dithering scheme in order for the 16-bit image to look like the raw RGB image using an optical illusion by affecting the 16-bit image through diffusion of an error at each pixel position. Diffusion proportions in directions of pixels around each pixel can be determined by experimentation, and a sum of the diffusion proportions in directions of pixels around each pixel must be 1. An error-diffused image output from the first image error diffusion unit 512 is stored in the buffer.

The 16-bit image/first error-diffused image adder 513 adds the error-diffused image to the 16-bit image to which the raw RGB image is converted and outputs the added image to the second image error diffusion unit 514.

The second image error diffusion unit 514 diffuses a difference from a relevant pixel value of the raw RGB image toward pixels adjacent to a pixel existing at a position corresponding to each of error values between the added image and the 16-bit image using the same manner as the error diffusion operation in the first image error diffusion unit 512.

The 16-bit image/second error-diffused image adder 515 generates a final image, i.e., a second compensated image, by adding the 16-bit image'to a second error-diffused image output from the second image error diffusion unit 514 and outputs the generated final image to the 16-bit converter 502.

As described above, a quantization error between a 24-bit image and a 16-bit image to be converted can be minimized using adjacent pixels through the error diffusion operation between the 24-bit image and the 16-bit image.

When the final image output from the second image error diffusion unit 514 is input to the 16-bit converter 502, the 16-bit converter 502 converts the final image to a 16-bit image and outputs the converted 16-bit image to the image compressor 503. The image compressor 503 compresses the input 16-bit image. The Huffman method can be used as a compression method.

The compressed 16-bit image is stored in the memory 504, and information on the address and the image size of the stored 16-bit image is recorded in the index table. By managing the storage information of the stored 16-bit image using the index table and transmitting the index table when a compressed image is transmitted to the mobile communication terminal 530, even though a plurality of compressed images are transmitted to the mobile communication terminal 530, the mobile communication terminal 530 can use a desired image by referring to the index table.

The interface unit 505 performs an interfacing operation for transmitting the 16-bit image data compressed by the image processing apparatus 500 and the index table to an interface unit 531 included in the mobile communication terminal 530.

An image bit format conversion process performed in the image processing apparatus 500 illustrated in FIG. 5 according to a preferred embodiment of the present invention will now be described with reference to FIG. 6.

If a plurality of raw images are sequentially input to the image processing apparatus 500 in step 600, the controller 520 determines a format of each of the input raw images and controls the decoder 501 to generate a raw RGB image by performing decoding according to the determined image format in step 602. The generated raw RGB image is temporarily stored in the buffer.

The controller 520 controls the image pre-processor 510 to generate an error compensated image by compensating for an error between the raw RGB image and a 16-bit image in step 604. The error compensation will now be described in detail. A difference value between pixel values at the same positions of the raw RGB image and the 16-bit image is an error value, and a first error-diffused image is generated by diffusing an error value of each pixel toward pixels adjacent to the pixel using the dithering scheme. The first error-diffused image is added to the 16-bit image, and a final image, which is a second error-diffused image, is generated by diffusing each of error values between the added image and the 16-bit image toward pixels adjacent to each reference pixel using the dithering scheme.

The controller 520 controls the 16-bit converter 502 to convert the final image to a 16-bit image in step 606. The controller 520 controls the image compressor 503 to compress the converted 16-bit image data arid stores the compressed 16-bit image data in the memory 504 in step 608. Information on the compressed 16-bit image data is stored in the index table.

The controller 520 determines in step 610 whether all of the plurality of raw images are completely N-bit converted. If it is determined that all of the plurality of raw images are completely N-bit converted, this process ends. If it is determined that all of the plurality of raw images are not completely N-bit converted, this process goes back to step 602 in order to continue the image bit-format conversion.

Figure 7:
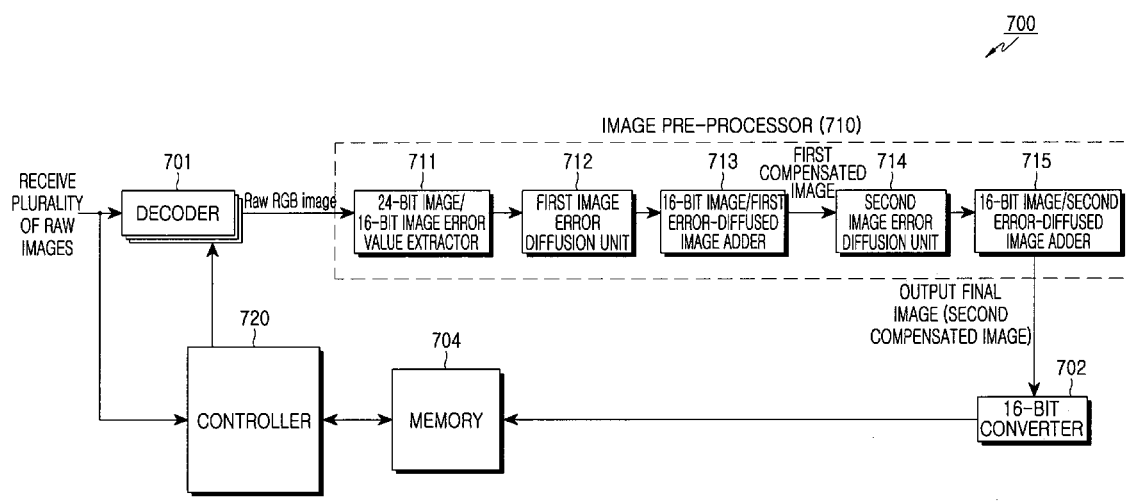
FIG. 7 is a block diagram of a mobile communication terminal for preventing degradation of image quality occurring when a bit format of an image is converted according to the present invention.
Figure 8:
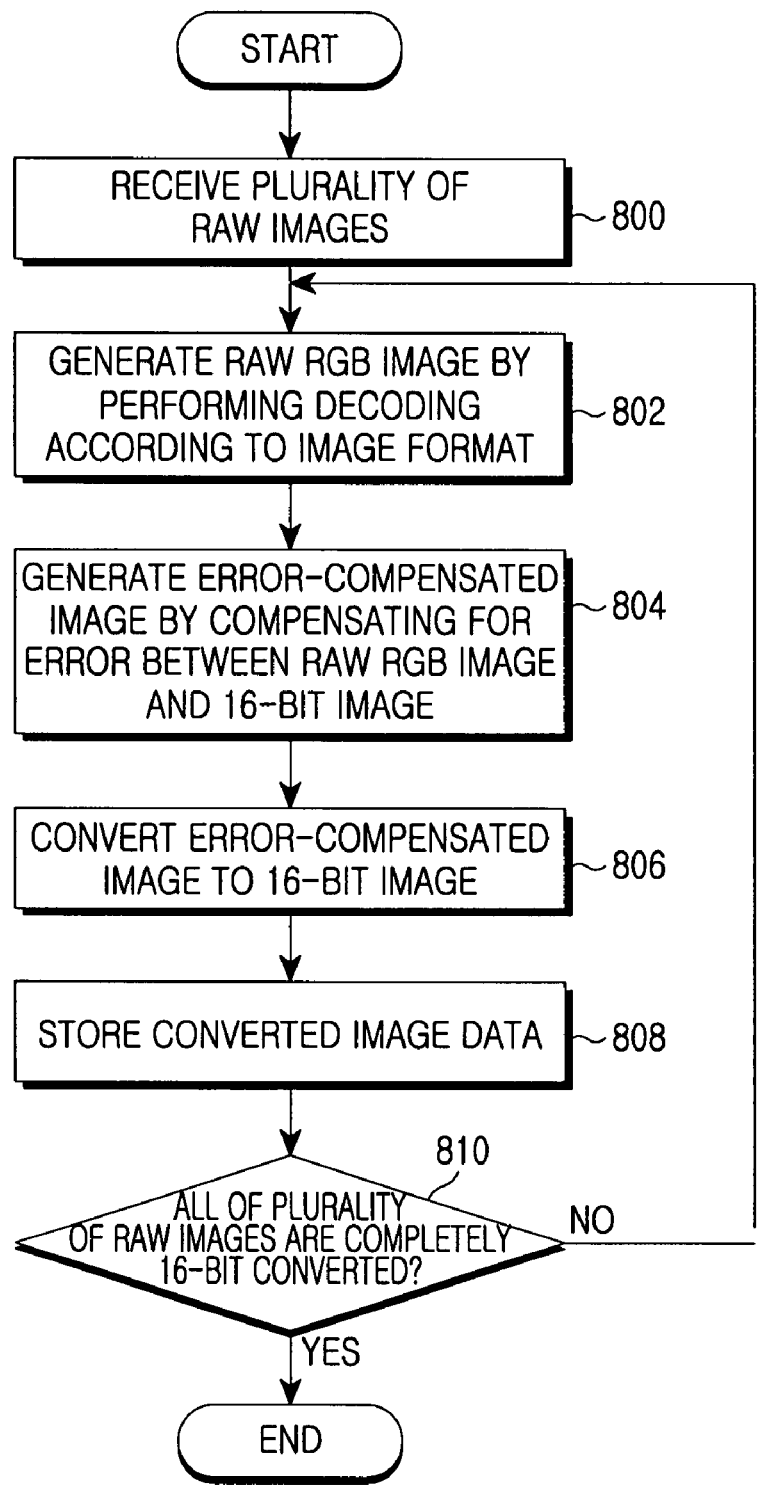
FIG. 8 is a flowchart illustrating a method of preventing degradation of image quality occurring when a bit format of an image is converted in the mobile communication terminal illustrated in FIG. 7 according to the present invention.

The method for converting a high quality raw image to an image for a mobile communication terminal in the mobile communication terminal will now be described with reference to FIGS. 7 and 8. FIG. 7 is a block diagram of a mobile communication terminal 700 for preventing degradation of image quality occurring when a bit format of an image is converted according to the present invention. Referring to FIG. 7, the mobile communication terminal 700 includes a controller 720 for performing a general control operation for image bit-format conversion, a decoder 701, an image pre-processor 710, a 16-bit converter 702, and a memory 704. The decoder 701, the image pre-processor 710, the 16-bit converter 702, and the memory 704 perform the same operations for image bit-format conversion as the decoder 501, the image pre-processor 510, the 16-bit converter 502, and the memory 504 illustrated in FIG. 5. The controller 720 of the mobile communication terminal 700 determines each of the formats of a plurality of raw images and controls the decoder 701 to generate a raw RGB image for performing decoding according to each format. The generated raw RGB image is temporarily stored in a buffer (not shown). The controller 720 controls the image pre-processor 710 to generate an error compensated image by compensating for an error between a raw image and a 16-bit image. A detailed operation to generate the error compensated image is the same as that of the image pre-processor 510 illustrated in FIG. 5. The controller 720 controls the 16-bit converter 702 to convert the error compensated image to a 16-bit image and stores the converted 16-bit image data in the memory 704. The controller 720 performs the image bit-format conversion operation and sequentially stores converted 16-bit image data in the memory 704 until all raw images to be converted are completely 16-bit converted.

A 24-bit image/16-bit image error value extractor 711; a first image error diffusion unit 712, a 16-bit image/first error-diffused image adder 713, a second image error diffusion unit 714, and a 16-bit image/second error-diffused image adder 715, which are included in the image pre-processor 710, respectively correspond to the 24-bit image/16-bit image error value extractor 511, the first image error diffusion unit 512, the 16-bit image/first error-diffused image adder 513, the second image error diffusion unit 514, and the 16-bit image/second error-diffused image adder 515, which are illustrated in FIG. 5. While the image processing apparatus 500 illustrated in FIG. 5 includes the image compressor 503 arid the index table for storing information on compressed data in order to transmit a bit-format converted image to the mobile communication terminal 530, the mobile communication terminal 700 illustrated in FIG. 7 does not have to include the image compressor 503 and the index table, which are illustrated in FIG. 5, since the mobile communication terminal 700 converts each raw image by itself.

An image bit format conversion process performed in the mobile communication terminal 700 illustrated in FIG. 7 according to the present invention will now be described with reference to FIG. 8.

If a plurality of raw images are sequentially input to the mobile communication terminal 700 in step 800, the controller 720 determines a format of each of the input raw images and controls the decoder 701 to generate a raw RGB image by decoding according to the determined image format in step 802. The generated raw RGB image is temporarily stored in the buffer.

The controller 720 controls the image pre-processor 710 to generate an error compensated image by compensating for an error between the raw RGB image and a 16-bit image in step 804. The error compensation will now be described in detail.

Figure 10:
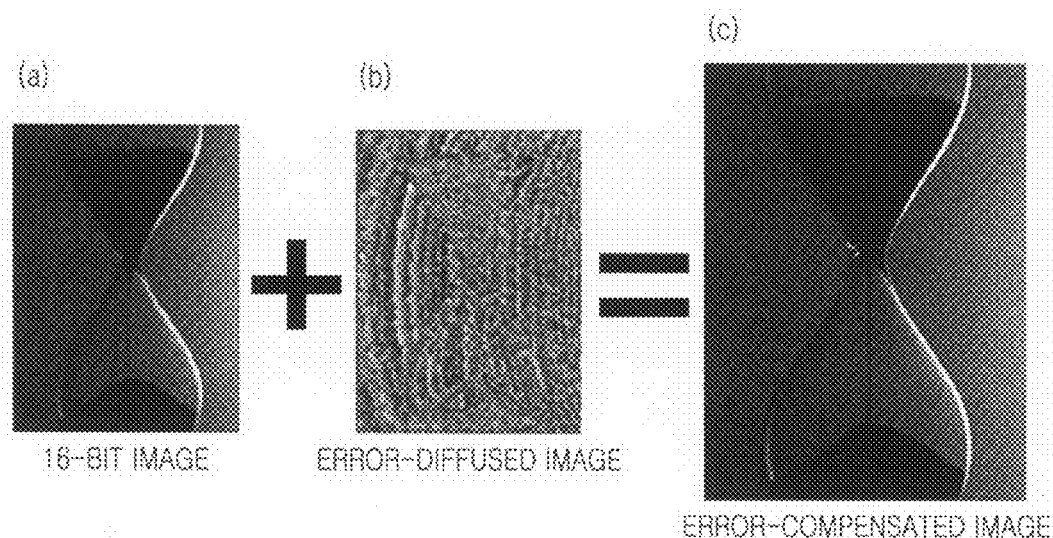
FIG. 10 illustrates a final 16-bit image output using a 16-bit image and an error compensated image in an image pre-processing operation for preventing degradation of image quality according to the present invention.

A difference value between pixel values at the same positions of the raw RGB image and the 16-bit image is an error value, and a first error-diffused image is generated by diffusing an error value of each pixel toward pixels adjacent to the pixel using the dithering scheme. The first error-diffused image is added to the 16-bit image, and a final image, which is a second error-diffused image, is generated by diffusing each of error values between the added image and the 16-bit image toward pixels adjacent to each reference pixel using the dithering scheme. Referring to FIG. 10 with respect to step 804, the 16-bit image of the raw RGB image as shown in (a) is added to the error-diffused image as shown in (b), and then the error compensated image is generated as shown in (c).

The controller 720 controls the 16-bit converter 702 to convert the final image to a 16-bit image in step 806. The controller 720 stores the converted 16-bit image data in the memory 704 in step 808.

The controller 720 determines in step 810 whether all of the plurality of raw images are completely N-bit converted. If it is determined that all of the plurality of raw images are completely N-bit converted, this process ends. If it is determined that all of the plurality of raw images are not completely N-bit converted, this process goes back to step 802 in order to continue the image bit-format conversion.

As described above, according to the present invention, when a raw image is converted to an image having specific color resolution, the image to be converted can maintain an image close to the raw image by obtaining each of errors between pixels of the raw image and the image to be converted and minimizing the errors between the raw image and the image to be converted using an error diffusion scheme. In addition, when an external device, such as a PC, converts an image to an image for a mobile communication terminal in order to effectively implement a GUI used in the mobile communication terminal, the occurrence of any degradation of the image quality can be minimized. In addition, a mobile communication terminal can perform an image bit-format conversion process of a downloaded or stored image by itself without an external device for converting a raw image to an image for the mobile communication terminal While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An image processing apparatus for preventing degradation of image quality occurring when a bit format of an image is converted, the apparatus comprising:

a decoder for decoding an input N-bit raw image, where N is an integer greater than 1;

an image pre-processor for generating an error-compensated image by extracting an error value per pixel, which is a difference value between pixels of the same positions of the decoded N-bit image and an M-bit image to be converted, where M is an integer greater than 0 and less than N, generating an error-diffused image by accumulating a value obtained by multiplying the error value per pixel by a different weight proportion with respect to predetermined adjacent pixels, and adding the M-bit image to the error-diffused image;

an M-bit converter for converting the error-compensated image to an M-bit image;

an image compressor for compressing the converted M-bit image;

a memory for storing the compressed M-bit image and an index table containing storage information of the M-bit image; and a controller for controlling the storing of the compressed M-bit image output from the image compressor in the memory and the storing of the storage information generated when the compressed M-bit image is stored in the memory in the index table.

2. The apparatus of claim 1, wherein the image pre-processor comprises:

a 24-bit image/16-bit image error value extractor for, if the decoded N-bit image is input, extracting an error value, which is a difference value between each pixel value of each of R, G, and B channels of the N-bit image and each pixel value of each of R, G, and B channels of the M-bit image to be converted;

a first image error diffusion unit for generating a first error-diffused image by diffusing differences from pixel values of the M-bit image by accumulating a value obtained by multiplying the error value per pixel by a different weight proportion with respect to each of the predetermined adjacent pixels;

an M-bit image/first error-diffused image adder for generating a first error-compensated image by adding the first error-diffused image to the M-bit image;

a second image error diffusion unit for generating a second error-diffused image by accumulating a value obtained by multiplying each error value between the first error-compensated image and the M-bit image by a weight proportion predetermined to each pixel adjacent to a reference pixel; and an M-bit image/second error-diffused image adder for generating a second error-compensated image by adding the second error-diffused image to the M-bit image.

3. The apparatus of claim 2, wherein a sum of diffusion proportions toward pixels adjacent to each reference pixel is 1.

4. The apparatus of claim 1, wherein the N-bit image has greater image quality than the M-bit image.

5. A mobile communication terminal for preventing degradation of image quality occurring when a bit format of an image is converted, the mobile communication terminal comprising:

a decoder for decoding an input N-bit raw image, where N is an integer greater than 1;

an image pre-processor for generating an error-compensated image by extracting an error value per pixel, which is a difference value between pixels of the same positions of the decoded N-bit image and an M-bit image to be converted, where M is an integer greater than 0 and less than N, generating an error-diffused image by accumulating a value obtained by multiplying the error value per pixel by a different weight proportion with respect to predetermined adjacent pixels and adding the M-bit image to the error-diffused image;

an M-bit converter for converting the error-compensated image to an M-bit image;

a memory for storing the converted M-bit image; and a controller for controlling the storing of the converted M-bit image output from the M-bit converter in the memory.

6. The mobile communication terminal of claim 5, wherein the image pre-processor comprises:

a 24-bit image/16-bit image error value extractor for, if the decoded N-bit image is input, extracting an error value, which is a difference value between each pixel value of each of R, G, and B channels of the N-bit image and each pixel value of each of R, G, and B channels of the M-bit image to be converted;

a first image error diffusion unit for generating a first error-diffused image by diffusing differences from pixel values of the M-bit image by accumulating a value obtained by multiplying the error value per pixel by a different weight proportion with respect to each of the predetermined adjacent pixels;

an M-bit image/first error-diffused image adder for generating a first error-compensated image by adding the first error-diffused image to the M-bit image;

a second image error diffusion unit for generating a second error-diffused image by accumulating a value obtained by multiplying each error value between the first error-compensated image and the M-bit image by a weight proportion predetermined to each pixel adjacent to a reference pixel; and an M-bit image/second error-diffused image adder for generating a second error-compensated image by adding the second error-diffused image to the M-bit image.

7. The mobile communication terminal of claim 6, wherein a sum of diffusion proportions toward pixels adjacent to each reference pixel is 1.

8. The mobile communication terminal of claim 5, wherein the N-bit image has greater image quality than the M-bit image.

9. A method of preventing degradation of image quality occurring when a bit format of an image is converted in an image processing apparatus, the method comprising the steps of:

determining a format of an input N-bit raw image and performing decoding for the determined format, where N is an integer greater than 1;

generating, by an image pre-processor, an error-compensated image by extracting an error value per pixel, which is a difference value between pixels of the same positions of the decoded N-bit image and an M-bit image to be converted, where M is an integer greater than 0 and less than N, generating an error-diffused image by accumulating a value obtained by multiplying the error value per pixel by a different weight proportion with respect to predetermined adjacent pixels, and adding the M-bit image to the error-diffused image;

converting the error-compensated image to an M-bit image;

compressing the converted M-bit image; and storing the compressed M-bit image and an index table containing storage information of the M-bit image in a memory.

10. The method of claim 9, wherein the step of generating the error-compensated image comprises:

if the decoded N-bit image is input, extracting an error value, which is a difference value between each pixel value of each of R, G, and B channels of the N-bit image and each pixel value of each of R, G, and B channels of the M-bit image to be converted;

generating a first error-diffused image by diffusing differences from pixel values of the M-bit image by accumulating a value obtained by multiplying the error value per pixel by a different weight proportion with respect to each of the predetermined adjacent pixels;

generating a first error-compensated image by adding the first error-diffused image to the M-bit image;

generating a second error-diffused image by accumulating a value obtained by multiplying each error value between the first error-compensated image and the M-bit image by a weight proportion predetermined to each pixel adjacent to a reference pixel; and generating a second error-compensated image by adding the second error-diffused image to the M-bit image.

11. The method of claim 10, wherein a sum of diffusion proportions toward pixels adjacent to each reference pixel is 1.

12. The method of claim 9, wherein the N-bit image has greater image quality than the M-bit image.

13. A method of preventing degradation of image quality occurring when a bit format of an image is converted in a mobile communication terminal, the method comprising the steps of:

determining a format of an input N-bit raw image and performing decoding for the determined format, where N is an integer greater than 1;

generating, by an image pre-processor, an error-compensated image by extracting an error value per pixel, which is a difference value between pixels of the same positions of the decoded N-bit image and an M-bit image to be converted, where M is an integer greater than 0 and less than N, generating an error-diffused image by accumulating a value obtained by multiplying the error value per pixel by a different weight proportion with respect to predetermined adjacent pixels, and adding the M-bit image to the error-diffused image;

converting the error-compensated image to an M-bit image; and storing the converted M-bit image in a memory.

14. The method of claim 13, wherein the step of generating the error-compensated image comprises:

if the decoded N-bit image is input, extracting an error value, which is a difference value between each pixel value of each of R, G, and B channels of the N-bit image and each pixel value of each of R, G, and B channels of the M-bit image to be converted;

generating a first error-diffused image by diffusing differences from pixel values of the M-bit image by accumulating a value obtained by multiplying the error value per pixel by a different weight proportion with respect to each of the predetermined adjacent pixels;

generating a first error-compensated image by adding the first error-diffused image to the M-bit image;

generating a second error-diffused image by accumulating a value obtained by multiplying each error value between the first error-compensated image and the M-bit image by a weight proportion predetermined to each pixel adjacent to a reference pixel; and generating a second error-compensated image by adding the second error-diffused image to the M-bit image.

15. The method of claim 14, wherein a sum of diffusion proportions toward pixels adjacent to each reference pixel is 1.

16. The method of claim 13, wherein the N-bit image has higher image quality than the M-bit image.

* * * * *